US010639610B2

United States Patent
Matsui et al.

(10) Patent No.: US 10,639,610 B2
(45) Date of Patent: May 5, 2020

(54) FILM DETERIORATION PREVENTING MATERIAL AND ACID GAS REMOVING AGENT

(71) Applicant: ASHIGARA MANUFACTURING INC., Kanagawa (JP)

(72) Inventors: Kazunori Matsui, Kanagawa (JP); Terumitsu Ishii, Kanagawa (JP); Akira Hashimoto, Kanagawa (JP)

(73) Assignee: ASHIGARA MANUFACTURING INC., Kanagawa (JP)

( * ) Notice: Subject to any disclaimer, the term of this patent is extended or adjusted under 35 U.S.C. 154(b) by 127 days.

(21) Appl. No.: 15/763,594

(22) PCT Filed: Sep. 29, 2016

(86) PCT No.: PCT/JP2016/078898
§ 371 (c)(1),
(2) Date: Mar. 27, 2018

(87) PCT Pub. No.: WO2017/057620
PCT Pub. Date: Apr. 6, 2017

(65) Prior Publication Data
US 2018/0272310 A1    Sep. 27, 2018

(30) Foreign Application Priority Data
Sep. 29, 2015    (JP) ................... 2015-190747

(51) Int. Cl.
*B01J 20/04*      (2006.01)
*B01D 53/14*     (2006.01)
*B65D 81/26*     (2006.01)
*B01D 53/72*     (2006.01)
*B01D 53/82*     (2006.01)
*B01J 20/28*     (2006.01)

(52) U.S. Cl.
CPC ............ *B01J 20/043* (2013.01); *B01D 53/14* (2013.01); *B01D 53/72* (2013.01); *B01D 53/82* (2013.01); *B01J 20/04* (2013.01); *B01J 20/28033* (2013.01); *B65D 81/26* (2013.01); *B65D 81/267* (2013.01); *B01D 2251/304* (2013.01); *B01D 2251/306* (2013.01); *B01D 2251/606* (2013.01); *B01D 2257/70* (2013.01)

(58) Field of Classification Search
CPC .... B01J 20/04; B01J 20/043; B01J 20/28033; B01D 53/72; B01D 53/82; B01D 2251/304; B01D 2251/306; B01D 2251/606; B01D 2257/70; B65D 81/267
USPC ........................................................ 502/402
See application file for complete search history.

(56) References Cited

U.S. PATENT DOCUMENTS

| 2002/0146452 A1 | 10/2002 | Miller, III et al. |
| 2006/0257477 A1 | 11/2006 | Miller, III et al. |
| 2006/0257478 A1 | 11/2006 | Miller, III et al. |
| 2010/0212506 A1 | 8/2010 | Togashi et al. |

FOREIGN PATENT DOCUMENTS

| JP | H06-296858 A | 10/1994 |
| JP | H08-217913 A | 8/1996 |
| JP | 2004-517726 A | 6/2004 |
| JP | 2006-297211 A | 11/2006 |
| JP | 2013-104030 A | 5/2013 |
| WO | 2009/041257 A1 | 4/2009 |

OTHER PUBLICATIONS

International Search Report from Patent Application No. PCT/JP2016/078898, dated Nov. 8, 2016.
International Preliminary Report on Patentability from Patent Application No. PCT/JP2016/078898, dated Apr. 3, 2018.
Extended European Search Report for Counterpart Patent Appl. No. EP16851791.0, dated Feb. 22, 2019.

*Primary Examiner* — Edward M Johnson
(74) *Attorney, Agent, or Firm* — Greenblum & Bernstein, P.L.C.

(57) ABSTRACT

The present invention provides a film deterioration preventing material for using together with a record storage film having a triacetyl cellulose film as the base film thereof, wherein the material includes an alkali metal carbonate or an alkali metal hydrogen carbonate as an acetic acid gas removing agent to remove the acetic acid gas in an atmosphere. The present invention also provides an acid gas removing agent to remove the acid gas in an atmosphere, wherein the acid gas in the atmosphere is removed by an alkali metal carbonate or an alkali metal hydrogen carbonate.

7 Claims, 4 Drawing Sheets

FILM DETERIORATION PREVENTING MATERIAL AND ACID GAS REMOVING AGENT

TECHNICAL FIELD

The present invention relates to a film deterioration preventing material and an acid gas removing agent to preserve a record storage film having a triacetyl cellulose film as a base film.

BACKGROUND ART

The record storage film having triacetyl cellulose (TAC) as the base film (hereinafter, referred to as the "TAC film") thereof is used for the purpose of recording and preserving various historical data, documents or the like, in a form of, for example, "cinematographic films", "microfilms", or "photographic films". As compared with the nitrocellulose film used in the past, the TAC film is higher in flame resistance and referred to as a safety film, and has also been considered to be preserved for 100 years or more.

However, it has recently been revealed that a phenomenon referred to as vinegar syndrome occurs in common preservation environments, and the deterioration of the TAC film starts within approximately 30 years. When a TAC film is preserved in high-temperature and high-humidity environments, the hydrolysis of TAC occurs due to the factors such as temperature and humidity, and consequently acetic acid gas is generated. The acetic acid gas acts as a catalyst and promote the hydrolysis reaction of TAC. The vinegar syndrome indicates a rapid deterioration phenomenon of the film caused by such a hydrolysis of TAC.

With respect to such a vinegar syndrome, in order to prevent the deterioration of the TAC film, it has hitherto been performed to preserve a TAC film together with a humidity-controlling/gas-absorbing molded article including a gas-absorbing composition containing MgO and $Al_2O_3$ (see, for example, Patent Literature 1 (Japanese Patent Laid-Open No, H08-217913)). The present applicant has also proposed a film deterioration preventing material containing a carboxylate salt as an acetic acid gas removing agent (for example, see Patent Literature 2 (Japanese Patent Laid-Open No. 2013-104030)). The film deterioration preventing material absorbs a larger amount of acetic acid gas and removes the acetic acid gas more rapidly, as compared with the humidity-controlling/gas-absorbing molded article described in Patent Literature 1. Accordingly, by placing and preserving a TAC film together with the film deterioration preventing material in a preservation container, the deterioration of the TAC film can be effectively suppressed.

CITATION LIST

Patent Literature

[Patent Literature 1] Japanese Patent Laid-Open No. H08-217913
[Patent Literature 2] Japanese Patent Laid-Open No. 2013-104030

SUMMARY OF INVENTION

Technical Problem

Actually, the film deterioration preventing material is effective as a deterioration preventing material for small-size TAC films such as a "microfilm" and a "photographic film" each having a mass of a few tens grams per one film. However, when the film deterioration preventing material is used for a large-size TAC film such as a "cinematographic film" having a mass of a few kilograms per one film, the following problem has been revealed.

When the deterioration of the TAC film starts, the acetic acid gas is continuously emitted from the TAC film in the preservation container until the emitted amount reaches the total generation amount. Considering the deterioration of a large-size TAC film such as a "cinematographic film", the total generation amount of the acetic acid gas is extremely larger as compared with the case of a small-size TAC film such as a "microfilm". A large-size TAC film emits the acetic acid gas into the atmosphere at a faster rate than a small-size TAC film.

Accordingly, in the case where a conventional film deterioration preventing material is used for a large-size TAC film, even when the acetic acid gas in the preservation container is removed by using the film deterioration preventing material, the acetic acid gas is supplied from the large-size TAC film in the preservation container in a larger amount and at a faster rate than in the removal amount and at the removal rate of the acetic acid gas by using the film deterioration preventing material, respectively. Therefore, in the case where a conventional film deterioration preventing material is used for a large-size TAC film, unless a large amount of the film deterioration preventing material is placed in the preservation container, it is difficult to maintain the low level of acetic acid gas concentration.

However, because a commonly used preservation container for a TAC film is designed to have a predetermined size according to the size of the TAC film, the space capable of placing a film deterioration preventing material is limited. Therefore, a film deterioration preventing material used for a large-size TAC film is desired to be small, have a large capacity for removing the acetic acid gas, and be capable of rapidly removing the acetic acid gas.

Accordingly, the technical problem of the present invention is to provide a film deterioration preventing material and an acid gas removing agent both having a large capacity for removing the acetic acid gas per unit mass and capable of rapidly removing the acid gas such as the acetic acid gas in the atmosphere.

Solution to Problem

The present inventors made a diligent study, and consequently have solved the above-described problem by adopting the following film deterioration preventing material and the following acid gas removing agent.

The film deterioration preventing material according to the present invention is used to preserve a record storage film having a triacetyl cellulose film as the base film thereof, wherein the material includes an alkali metal carbonate or an alkali metal hydrogen carbonate as an acetic acid gas removing agent to remove the acetic acid gas in an atmosphere.

The acid gas removing agent according to the present invention is used to remove the acid gas in an atmosphere, by using an alkali metal carbonate or an alkali metal hydrogen carbonate.

Advantageous Effects of Invention

According to the present invention, it is possible to provide a film deterioration preventing material and an acid gas removing agent both having a large capacity for removing the acetic acid gas per unit mass and capable of rapidly removing the acid gas such as the acetic acid gas in the atmosphere.

DESCRIPTION OF EMBODIMENTS

Figure 1:
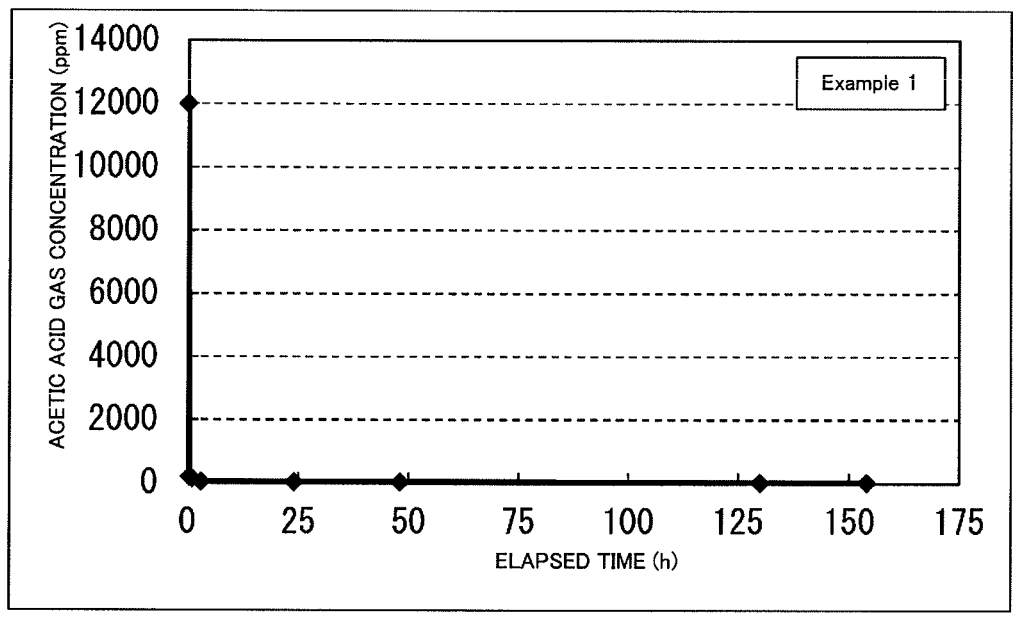
FIG. 1 shows the variation of the acetic acid gas concentration when the acetic acid gas removing agent (Sample 1) of Example 1 was used.

Hereinafter, the embodiments of the film deterioration preventing material and the acetic acid gas removing agent according to the present invention are described.
1. Film Deterioration Preventing Material First, an embodiment of the film deterioration preventing material according to the present invention is described. This material is used to preserve a recording film such as a so-called TAC film, in order to prevent the deterioration of the film. In particular, this material can be suitably used in order to prevent the occurrence or to suppress the progress of the so-called vinegar syndrome. Hereinafter, description concerning a TAC film is mainly given below as an example of the recording film.
1-1. Factors of Vinegar Syndrome Before the constitution of the film deterioration preventing material is described, the factors that allow the vinegar syndrome to occur or to progress are described.

As described above, the vinegar syndrome indicates the rapid deterioration phenomenon of the film caused by the hydrolysis of TAC. As the factors that allow the hydrolysis of TAC to proceed, the possibilities are (1) the residual catalyst (sulfuric acid) used during the synthesis of TAC, (2) the atmospheric humidity and the atmospheric temperature, and (3) the acetic acid gas generated by the hydrolysis of TAC.
(1) Residual Catalyst (Sulfuric Acid)

TAC is industrially obtained by allowing cellulose and anhydrous acetic acid to react with each other. In the reaction between cellulose and anhydrous acetic acid, sulfuric acid is often used as a catalyst. This catalyst sulfuric acid is removed in the production process, but a small amount of sulfuric acid possibly remains as a catalytic trace in the TAC film.

(2) Atmospheric Humidity and Atmospheric Temperature

In the case where a TAC film is preserved in a preservation container, when the atmospheric humidity and the atmospheric temperature in the preservation container reached a certain condition, the hydrolysis reaction of TAC tends to occur due to, for example, the above-described presence of sulfuric acid.
(3) Acetic Acid Gas TAC is decomposed by the hydrolysis reaction into cellulose and acetic acid. The acetic acid gas acts as a catalyst for promoting the hydrolysis of TAC. Accordingly, when the concentration of the acetic acid gas in the preservation container comes to be high, the hydrolysis reaction of TAC is promoted, and the deterioration of the TAC film rapidly proceeds.
1-2. Constituent Materials of Film Deterioration Preventing Material
(1) Summary In view of the above-described factors for the vinegar syndrome, the occurrence of the vinegar syndrome is expected to be prevented by removing the sulfuric acid remaining in the TAC film. However, because the removal of the sulfuric acid is difficult, in order to prevent the occurrence or to suppress the progress of the vinegar syndrome, it is necessary to maintain the low level of the acetic acid gas concentration in the preservation atmosphere by removing the acetic acid gas in the preservation atmosphere.

In addition, as described above, when the deterioration of a TAC film starts, the acetic acid gas is continuously emitted from the TAC film in the preservation container. The total generation amount of the acetic acid gas generated from a large-size TAC film generates extremely larger amount of the acetic acid totally than a small-size TAC film; and the large-size TAC film emits the acetic acid at a faster rate than the small-size TAC film. Therefore, in order to prevent the deterioration of such a large-size TAC film, it is necessary to provide a film deterioration preventing material. This material can remove the acetic acid gas in the atmosphere at a faster rate than the emission rate from the large-size TAC film, and can ensure a large removable amount of the acetic acid gas per unit mass. From such a viewpoint, the present inventors have arrived at the use of an alkali metal carbonate or an alkali metal hydrogen carbonate as an acetic acid gas removing agent.
(2) Alkali Metals Carbonates and Alkali Metals Hydrogen Carbonates
a) Types of Applicable Alkali Metal Carbonates and Alkali Metal Hydrogen Carbonates First, the alkali metal carbonates and the alkali metal hydrogen carbonates according to the present invention are described.

As the alkali metal carbonates, lithium carbonate, sodium carbonate, and potassium carbonate can be used. Among them, from the viewpoint of easy availability and cost advantage, sodium carbonate or potassium carbonate is preferable, and from the viewpoint of easy handleability, sodium carbonate is further preferable.

As the alkali metal hydrogen carbonate, sodium hydrogen carbonate or potassium hydrogen carbonate is preferable. In addition, from the viewpoint of easy handleability, sodium hydrogen carbonate is further preferable.
b) Acetic Acid Gas Removal Reaction First, the acetic acid gas removal reactions by using an alkali metal carbonate and an alkali metal hydrogen carbonate are described.

The acetic acid gas removal reaction by using an alkali metal carbonate can be represented by the following reaction formula (1). It is to be noted that "M" in the formula represents an alkali metal, and is any one of Li, Na, and K.

$$M_2CO_3 + 2CH_3COOH \rightarrow 2CH_3COOM + CO_2 + H_2O \quad (1)$$

The acetic acid gas removal reaction by using an alkali metal hydrogen carbonate can be represented by the following reaction formula (2).

$$MHCO_3 + CH_3COOH \rightarrow CH_3COOM + CO_2 + H_2O \quad (2)$$

As shown by the reaction formula (1) and the reaction formula (2), when an alkali metal carbonate or an alkali metal hydrogen carbonate reacts with the acetic acid gas in an atmosphere, an alkali metal acetate, carbon dioxide and water are produced. Due to such an effect, the acetic acid gas in the atmosphere is removed.

In the above-described reactions, due to the water vapor present in the atmosphere and the water produced as a reaction product on the surface of the acetic acid gas removing agent, the alkali metal acetate, one of the reaction product, is ionized into an alkali metal ion and an acetate ion (the following reaction formula (3)), and further, the acetate ion reacts with water (the following reaction formula (4)). In this case, although the alkali metal ion is ionized completely, the acetate ion, a weak acid, is partially bonded with the hydrogen ion derived from water and returns to the original acetic acid. Consequently, the surface of the acetic acid gas removing agent comes to be basic, and accordingly the reaction formula (1) and the reaction formula (2) tend to proceed further easily. In addition, likewise, the carbon dioxide, one of the reaction product, is emitted into the atmosphere from the surface of the acetic acid gas removing agent. Consequently, the alkali metal acetate mixed in the water present on the surface of the acetic acid gas removing agent is removed from the surface of the acetic acid gas removing agent.

$$CH_3COOM \rightarrow CH_3COO^- + M^+ \quad (3)$$

$$CH_3COO^- + H_2O \rightarrow CH_3COOH + OH^- \quad (4)$$

As described above, in the present invention, the reaction formula (1) and the reaction formula (2) tend to proceed to the right-hand side, and accordingly the acetic acid gas in the atmosphere can be rapidly removed.

Consequently, as for the capacity for removing the acetic acid gas per unit mass, the film deterioration preventing material in the present invention is superior to the conventional ones. By using alkali metal carbonates or alkali metal hydrogen carbonates, the acetic acid gas removal rate can be faster than the acetic acid gas emission rate from a large-size TAC film, and it is possible to maintain the low level of acetic acid gas concentration in the atmosphere.

Therefore, according to the present invention, it is possible to provide a film deterioration preventing material having a larger capacity for removing the acetic acid gas per unit mass and capable of rapidly removing an acid gas such as acetic acid gas in the atmosphere as compared with conventional ones. Consequently, even when a large amount of acetic acid gas is continuously emitted from a large-size TAC film, an acetic acid gas removal reaction continuously occurs, and the acetic acid gas concentration inside a preservation container can be maintained low.

In contrast, when the carboxylic acid salt previously proposed by the present inventors, such as sodium polyacrylate, is used as the acetic acid gas removing agent, the acetic acid gas removal reaction can be represented by the following reaction formula (5).

$$[CH_2-CH(COONa)]_n + nCH_3COOH \rightarrow [CH_2-CH(COOH)]_n + nCH_3COONa \quad (5)$$

As shown in the reaction formula (5), when sodium polyacrylate reacts with the acetic acid gas in the atmosphere, H in the acetic acid is substituted with Na in sodium polyacrylate and consequently sodium acetate is produced. In the case where the acetic acid gas removing agent is sodium polyacrylate, in contrast to the case of an alkali metal carbonate and an alkali metal hydrogen carbonate, neither water nor a gas such as carbon dioxide is produced by the acetic acid gas removal reaction.

Consequently, sodium acetate, a reaction product, tends to be deposited on the surface of the acetic acid gas removing agent. As the acetic acid gas removal reaction proceeds, the surface of the acetic acid gas removing agent is covered with sodium acetate, which is considered to physically disturb the reaction with acetic acid.

Therefore, sodium polyacrylate has a smaller capacity for removing the acetic acid gas per unit mass, as compared with an alkali metal carbonate and an alkali metal hydrogen carbonate. Consequently, although sodium polyacrylate is effective in the case where a small amount (for example, approximately 80 ppm) of acetic acid gas is emitted from a small-size TAC film, in the case where a large amount of acetic acid gas is continuously emitted from a large-size TAC film, it is impossible to maintain the low level of acetic acid gas concentration inside the preservation container, depending on the used amount of sodium polyacrylate.

In addition, sodium polyacrylate is used in a state of a fine powder, accordingly can secure a contact area with acetic acid gas and show fast gas removal rate of acetic acid. However, due to a state of fine powder, and accordingly, in general, the required volume of sodium polyacrylate is larger as compared with an alkali metal carbonate and an alkali metal hydrogen carbonate to remove a predetermined amount of acetic acid.

Therefore, in order to sufficiently remove a large amount of the acetic acid gas emitted from a large-size TAC film by using sodium polyacrylate, a large amount and a large volume of an acetic acid gas removing agent are required. Consequently, to preserve a large-size TAC film, the volume of the preservation container is required to be large, which is unpreferable. When sodium polyacrylate is used in an amount not to occupy the placement of a large-size TAC film in a preservation container having an ordinary size for a large-size TAC film, it is impossible to sufficiently remove a large amount of the acetic acid gas emitted from the large-size TAC film.

Similarly, when an alkaline earth metal carbonate such as calcium carbonate is used as an acetic acid gas removing agent, the acetic acid gas removal reaction can be represented by the following reaction formula (6).

$$CaCO_3 + 2CH_3COOH \rightarrow (CH_3COO)_2Ca + CO_2 + H_2O \quad (6)$$

As shown in the reaction formula (6), when calcium carbonate reacts with acetic acid, an alkaline earth metal acetate (calcium acetate), carbon dioxide and water are produced, similarly to the case of an alkali metal carbonate. However, an alkaline earth metal carbonate is lower in water solubility as compared with an alkali metal carbonate. Therefore, the reactivity with acetic acid is expected to be improved in the case where an alkali metal carbonate is used as the acetic acid gas removing agent.

In addition, as compared with an alkali metal carbonate, an alkaline earth metal carbonate is weaker in alkalinity, and hence is lower in the reactivity to the acetic acid gas. Moreover, an alkali metal acetate (for example, sodium acetate) is formed of one alkali metal ion and one acetate ion, but an alkaline earth metal acetate (for example, calcium acetate) is formed of one alkaline earth metal ion and two acetate ions. Consequently, when an alkaline earth metal acetate is deposited on the surface of an acetic acid gas removing agent, the alkaline earth metal acetate is expected to cover densely the surface and not to be removed.

Therefore, an alkaline earth metal carbonate has a smaller capacity for removing the acetic acid gas per unit mass, as compared with an alkali metal carbonate and an alkali metal hydrogen carbonate. Consequently, an alkaline earth metal carbonate cannot maintain the low level of acetic acid gas concentration inside the preservation container, in the case where a large amount of acetic acid gas is continuously emitted from a large-size TAC film.

Similarly, in the case where particulate sodium hydroxide is used as an acetic acid gas removing agent, the acetic acid gas removal reaction can be represented by the following reaction formula (7).

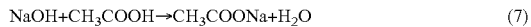

$$NaOH + CH_3COOH \rightarrow CH_3COONa + H_2O \quad (7)$$

Sodium hydroxide shows strong alkalinity and reacts easily with acetic acid. However, sodium hydroxide deliquesces due to the moisture in the air. When sodium hydroxide deliquesces in the preservation container and contact with the TAC film, the TAC film is liable to be damaged. Therefore, sodium hydroxide is difficult to handle, and is not suitable for application as a film deterioration preventing material.

1-3. Product Form of Film Deterioration Preventing Material

Next, the product form of the film deterioration preventing material according to the present invention is described. The film deterioration preventing material preferably has the following product form and is preferably improved in the handleability of the film deterioration inhibitor composed of an alkali metal carbonate or an alkali metal hydrogen carbonate as the acetic acid gas removing agent. It is to be noted that the film deterioration inhibitor as referred to herein includes as a component at least the acetic acid gas removing agent, may include, in addition to the acetic acid gas removing agent, for example, another component to improve the film deterioration preventing performance, and a moisture regulating agent to regulate the moisture in the atmosphere. Herein, an alkali metal carbonate or an alkali metal hydrogen carbonate, or a mixture of an alkali metal carbonate or an alkali metal hydrogen carbonate and other components is referred to as a film deterioration inhibitor.

(1) First Product Form

A first product form of the film deterioration preventing material according to the present invention can be obtained by kneading and molding the film deterioration inhibitor with a thermoplastic resin.

A heretofore known thermoplastic resin can be used without being particularly limited. For example, there can be used polyethylene (PE), polypropylene (PP), polycarbonate (PC), polyacetal (polyoxymethylene: POM), polybutylene terephthalate (PBT), polyethylene terephthalate (PET), polyphenylene oxide (PPO), polyamide (PA), ethylene-vinyl acetate copolymer (EVA), ethylene-methacrylate copolymer, polyvinyl chloride (PVC), polystyrene (PS), acrylonitrile-butadiene-styrene copolymer (ABS), acrylonitrile-styrene copolymer (AS), polyester, polyacrylic acid ester, and polyvinylidene chloride (PVDC); these can be used each alone or in combinations of two or more thereof.

Among these, it is preferable to adopt a resin giving an appropriate gas permeability to the molded product; from such a viewpoint, it is preferable to use polyolefin resin, more preferably low-density polyethylene resin.

It is to be noted that when the film deterioration inhibitor is kneaded and molded with a thermoplastic resin, a heretofore known method can be adopted, without being particularly limited.

(2) Second Product Form

In addition, the film deterioration preventing material according to the present invention may be obtained by enclosing the film deterioration inhibitor in a container.

Examples of the container include a bag body formed in a bag shape by using a sheet-shaped packaging material and a box body formed in a box shape by using a sheet-shaped packaging material. The bag body or the box body is preferably formed by enclosing the film deterioration inhibitor inside thereof not to leak out the film deterioration inhibitor outside thereof.

As the sheet-shaped packaging material for forming a bag body or a box body, there can be used, for example, paper, cloth, non-woven fabric, or packaging films formed of resins or the like to be used for packaging food. These packaging members are also preferably materials that show appropriate gas permeability to the interior of a bag body or a box body. As the packaging members, there can be used neutralized paper in the case of using paper, and further, cloth, non-woven fabric and packaging films made of, for example, polyethylene, polypropylene, polyester and polyamide. Herein, the packaging films made of, for example, polyester and polyamide, having a low gas permeability are preferably used in a state of having small pinholes formed therein. More specifically, as polyethylene, low-density polyethylene (LDPE) and linear low-density polyethylene (LLDPE) are preferably used, and as polypropylene, for example, non-stretched polypropylene (CPP) and biaxially-stretched polypropylene (OPP) are preferably used. These synthetic resin films are used not only as a single-layer film but also as laminated films prepared by laminating packaging films that show different material quality. Examples of such laminated films include: double-layered films such as OPP/CPP, OPP/LDPE, PET/LDPE and PET/CPP; and triple or more-layered packaging films such as LDPE/OPP/LDPE, LDPE/CPP/LDPE and CPP/OPP/LDPE.

(3) Third Product Form

Moreover, the film deterioration preventing material according to the present invention may be obtained by processing the above-described film deterioration preventing material into a sheet shape. The film deterioration preventing material may be obtained by kneading the above-described film deterioration inhibitor with the foregoing thermoplastic resin or the like, and then processing the kneaded product into a sheet shape. The method for processing into a sheet shape is not particularly limited.

However, the film deterioration preventing material according to the present invention is not limited to the above-described three product forms, shown as examples, and may have any product forms. For example, the film deterioration preventing material according to the present invention may be a particulate film deterioration inhibitor itself, or a film deterioration inhibitor placed in a packaging container having gas permeability, without being particularly limited. Moreover, in the case where any one of the above-described product forms is adopted, the film deterioration preventing material is preferably provided with the following indicators.

(4) Indicators

Any one of the foregoing product forms may be adopted, and these film deterioration preventing materials are each preferably provided with an indicator showing the acidity in the atmosphere. The indicator is preferably installed at a position that can be visually recognized from outside, in the film deterioration preventing material. This is because the acidity or the humidity in the atmosphere can be visually recognized easily from the outside.

As the indicator showing the acidity, it is possible to use, for example, a sheet-shaped medium such as a sheet of paper made to support a solution containing a dye (pH indicator) or the like, changing the color thereof depending on the pH of the atmosphere. In other words, the same constitution as a pH test paper can be adopted.

2. Acid Gas Removing Agent 2-1. Constitution of Acid Gas Removing Agent

Next, the acid gas removing agent according to the present invention is described. The acid gas removing agent according to the present invention removes the acid gas in an atmosphere by using an alkali metal carbonate or an alkali metal hydrogen carbonate, and can be adopted approximately the same constitution as the foregoing film deterioration preventing material.

2-2. Product Form and Application of Acid Gas Removing Agent (1) Product Form

The acid gas removing agent according to the present invention can be adopted the same product form as the film deterioration preventing material. Therefore, the description relating to the product form is omitted herein. In addition, the other constitution of the foregoing acid gas removing agent can be adopted the same constitution and the same product form as the film deterioration preventing material.

(2) Application

In the case where an acid gas is liable to adversely affect a preservation object or the like, the acid gas removing agent can be used in order to prevent the deterioration of the preservation object, in the same manner as with the film deterioration preventing material. In this case, for example, by using the acid gas removing agent placed inside a preservation container, a preservation chamber or the like, together with the preservation object, the acid gas present in the preservation atmosphere can be removed.

In addition, the acid gas removing agent can be used not only with the preservation object, but also can be used, for example, for the purpose of improving the habitability of a living room. For example, when an acid gas due to a volatile organic compound (VOC) or the like is present in a living room, the acid gas is removed by using the acid gas removing agent, and thus the habitability can be improved.

The above-described embodiment is an aspect of the present invention and can be appropriately modified within the scope not to deviate from the gist of the present invention. For example, the application/shapes and the like are not particularly limited, and of course, additives and the like to impart various functions may be appropriately included.

Hereinafter, the present invention is described more specifically by way of Examples, but of course, the present invention is not limited to following Examples. In addition, in following Examples, mainly shown results are the evaluation concerning the acetic acid gas removal abilities by using the alkali metal carbonates as the acetic acid gas removing agents.

Example 1

In Example 1, as an acetic acid gas removing agent (acid gas removing agent), sodium carbonate ($Na_2CO_3$, guaranteed reagent, 199-01585, manufactured by Wako Pure Chemical Industries, Ltd.), an alkali metal carbonate, was adopted. Then, 50 g of sodium carbonate was weighed and placed in a box body formed of a commercially available copy paper (dimension: 10 cm×10 cm×3 cm), and was defined as Sample 1 for evaluation of the acetic acid gas removal ability.

Example 2

In Example 2, as the acetic acid gas removing agent (acid gas removing agent), potassium carbonate ($K_2CO_3$, guaranteed reagent, 162-03495, manufactured by Wako Pure Chemical Industries, Ltd.), an alkali metal carbonate, was adopted. Then, 50 g of potassium carbonate was placed in the same box body as in Example 1 and was defined as Sample 2.

Example 3

In Example 3, as the acetic acid gas removing agent (acid gas removing agent), sodium hydrogen carbonate ($NaHCO_3$, Japanese Pharmacopoeia, 192-13805, manufactured by Wako Pure Chemical Industries, Ltd.), an alkali metal hydrogen carbonate, was adopted. Then, 50 g of sodium hydrogen carbonate was placed in the same box body as in Example 1 and was defined as Sample 3.

Example 4

In Example 4, as the acetic acid gas removing agent (acid gas removing agent), potassium hydrogen carbonate ($KHCO_3$, guaranteed reagent, 166-03275, manufactured by Wako Pure Chemical Industries, Ltd.), an alkali metal hydrogen carbonate, was adopted. Then, 50 g of potassium hydrogen carbonate was placed in the same box body as in Example 1 and was defined as Sample 4.

COMPARATIVE EXAMPLES

Comparative Example 1

In Comparative Example 1, as the acetic acid gas removing agent (acid gas removing agent), the molecular sieve 5A (130-06075, manufactured by Wako Pure Chemical Industries, Ltd.) was adopted. Then, 100 g of the molecular sieve 5A was placed in the same box body as in Example 1 and was defined as Comparative Sample 1 to be compared with the sample of Example 1.

Comparative Example 2

In Comparative Example 2, as the acetic acid gas removing agent (acid gas removing agent), sodium polyacrylate (Na-PAA, 196-02955, polymerization degree: 22000 to 70000, manufactured by Wako Pure Chemical Industries, Ltd.) was adopted. Then, 50 g of sodium polyacrylate was weighed and placed in the same box body as in Example 1 and was defined as Comparative Sample 2 to be compared with the sample of Example 1.

Comparative Example 3

In Comparative Example 3, as the acetic acid gas removing agent (acid gas removing agent), calcium carbonate ($CaCO_3$, guaranteed reagent, 030-00385, manufactured by Wako Pure Chemical Industries, Ltd.) was adopted. Then, 50 g of calcium carbonate was weighed and placed in the same box body as in Example 1 and was defined as Comparative Sample 3 to be compared with the sample of Example 1.

Comparative Example 4

In Comparative Example 4, as the acetic acid gas removing agent (acid gas removing agent), a particulate sodium hydroxide (NaOH, guaranteed reagent, 198-13765, purity: 97%, manufactured by Wako Pure Chemical Industries, Ltd.) was adopted. Then, 100 g of sodium hydroxide was weighed and placed in the same box body as in Example 1 and was defined as Comparative Sample 4 to be compared with the sample of Example 1.

<Evaluation>

By using above-described Samples 1 to 3 and Comparative Samples 1 to 4, the acetic acid gas removal ability of each Sample was evaluated. The evaluation methods and the evaluation results are described in the mentioned order.

(1) Evaluation Methods

First, in order to reproduce the situation in which a large amount of acetic acid gas is continuously generated from a large-size TAC film placed in a preservation container, a cinematographic film deteriorated with age (hereinafter, referred to as the deteriorated cinematographic film) was placed in a glass desiccator with a volume of 12.17 L. The acetic acid gas concentration in the desiccator was increased with time from immediately after the deteriorated cinematographic film was placed, and thereafter reached approximately a constant state. However, the equilibrium concentration of the acetic acid gas filled in the desiccator was different depending on the preservation conditions and the mass of each deteriorated cinematographic film. In addition, in the case where one and the same deteriorated cinematographic film was used repeatedly, the neutralization of the acetic acid gas due to the acetic acid gas removing agent occurred repeatedly, and consequently the equilibrium concentration of the acetic acid gas emitted from the deteriorated cinematographic film was varied. Accordingly, in the present evaluation, first a deteriorated cinematographic film was placed in a desiccator in a vacant state, and then the desiccator was left until the acetic acid gas concentration inside the desiccator came to be constant. The acetic acid gas concentration at this time was taken as the concentration immediately before the placement of the sample.

After the acetic acid gas concentration in the desiccator came to be constant, the sample was placed in the desiccator. And, immediately after the placement of the sample, the acetic acid gas concentration in the desiccator was measured by using acetic acid gas detection tubes (No. 81 and No. 81L, manufactured by GASTEC Corporation) and a Tedlar bag. Subsequently, the acetic acid gas concentration in the desiccator was measured and recorded at a fixed time interval.

(2) Evaluation Results

Hereinafter, the evaluation results of respective Samples and respective Comparative Samples are described with reference to the accompanying drawings.

a) Sample 1

FIG. 1 shows the variation of the acetic acid gas concentration in the desiccator when Sample 1 was used.

As shown in FIG. 1, when sodium carbonate was used as the acetic acid gas removing agent, the acetic acid gas concentration was approximately 12000 ppm immediately before the placement of Sample 1 and was decreased to approximately 40 ppm at an elapsed time of 3 hours from the placement of Sample 1. Subsequently, the acetic acid gas concentration in the desiccator was maintained at approximately 40 ppm, even after the elapsed time of 150 hours, the acetic acid gas concentration in the desiccator was approximately 40 ppm.

In this way, it has been verified that sodium carbonate can rapidly decrease the acetic acid gas concentration in the desiccator, and at the same time, can maintain the low level of acetic acid gas concentration in the desiccator over a long period of time. This is probably due to large removal amount of acetic acid gas per unit mass of sodium carbonate and fast removal rate of acetic acid gas by using sodium carbonate.

b) Sample 2

Figure 2:
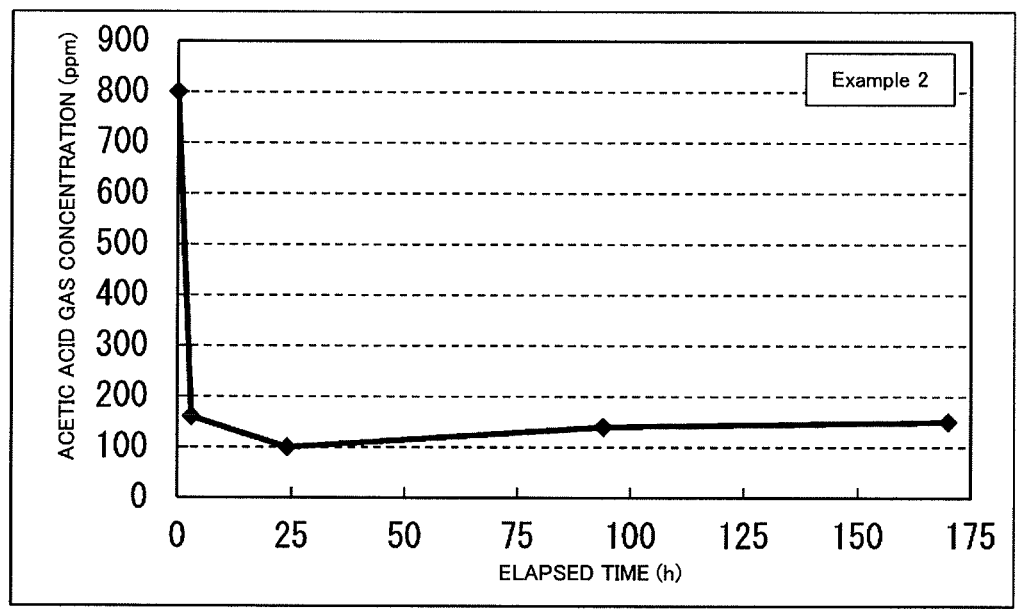
FIG. 2 shows the variation of the acetic acid gas concentration when the acetic acid gas removing agent (Sample 2) of Example 2 was used.

FIG. 2 shows the variation of the acetic acid gas concentration in the desiccator when Sample 2 was used.

As shown in FIG. 2, when potassium carbonate was used as the acetic acid gas removing agent, the acetic acid gas concentration was approximately 800 ppm immediately before the placement of Sample 2 and was decreased to approximately 160 ppm at an elapsed time of 4 hours from the placement of Sample 2. Subsequently, until 170 hours elapsed, the acetic acid gas concentration in the desiccator was maintained below 160 ppm.

In this way, it has been verified that potassium carbonate can rapidly decrease the acetic acid gas concentration in the desiccator, and at the same time, can maintain the low level of acetic acid gas concentration in the desiccator over a long period of time. This is probably due to large removal amount of the acetic acid gas per unit mass of potassium carbonate and fast removal rate of the acetic acid gas by using potassium carbonate.

c) Sample 3

Figure 3:
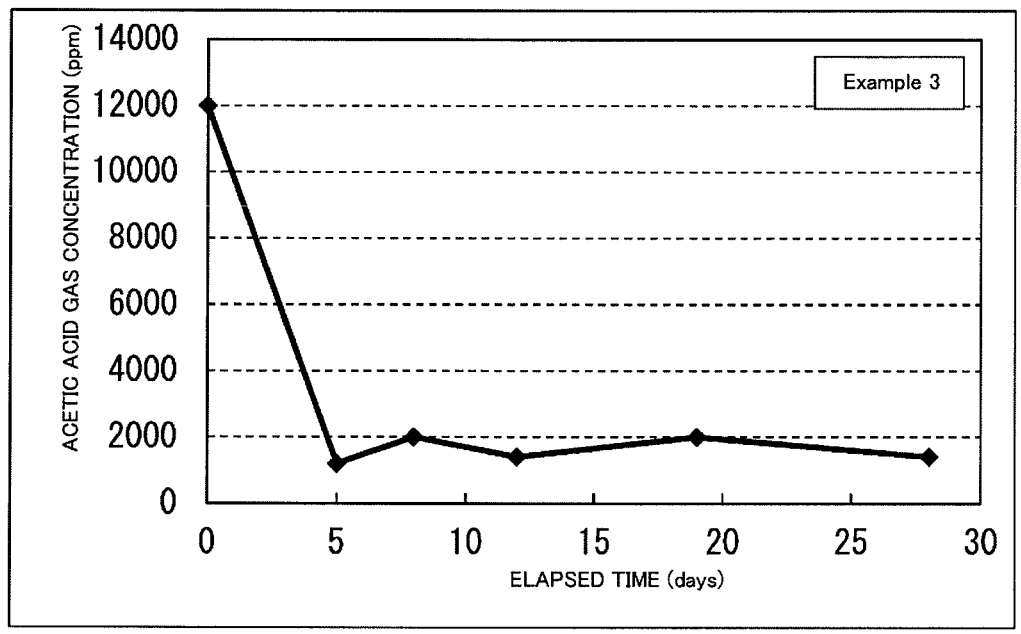
FIG. 3 shows the variation of the acetic acid gas concentration when the acetic acid gas removing agent (Sample 3) of Example 3 was used.

FIG. 3 shows the variation of the acetic acid gas concentration in the desiccator when Sample 3 was used.

As shown in FIG. 3, when sodium hydrogen carbonate was used as the acetic acid gas removing agent, the acetic acid gas concentration was 12000 ppm immediately before the placement of Sample 3 and was decreased to 1200 ppm at an elapsed time of 5 days (120 hours) from the placement of Sample 3. Subsequently, the acetic acid gas concentration in the desiccator came to be 2000 ppm at an elapsed time of 8 days (192 hours) and was thereafter continuously maintained below 2000 ppm.

In this way, it has been verified that sodium hydrogen carbonate can rapidly decrease the acetic acid gas concentration in the desiccator, and can maintain the low level of acetic acid gas concentration in the desiccator over a long period of time. This is probably due to large removal amount of the acetic acid gas per unit mass of sodium hydrogen carbonate and fast removal rate of the acetic acid gas by using sodium hydrogen carbonate.

d) Sample 4

Figure 4:
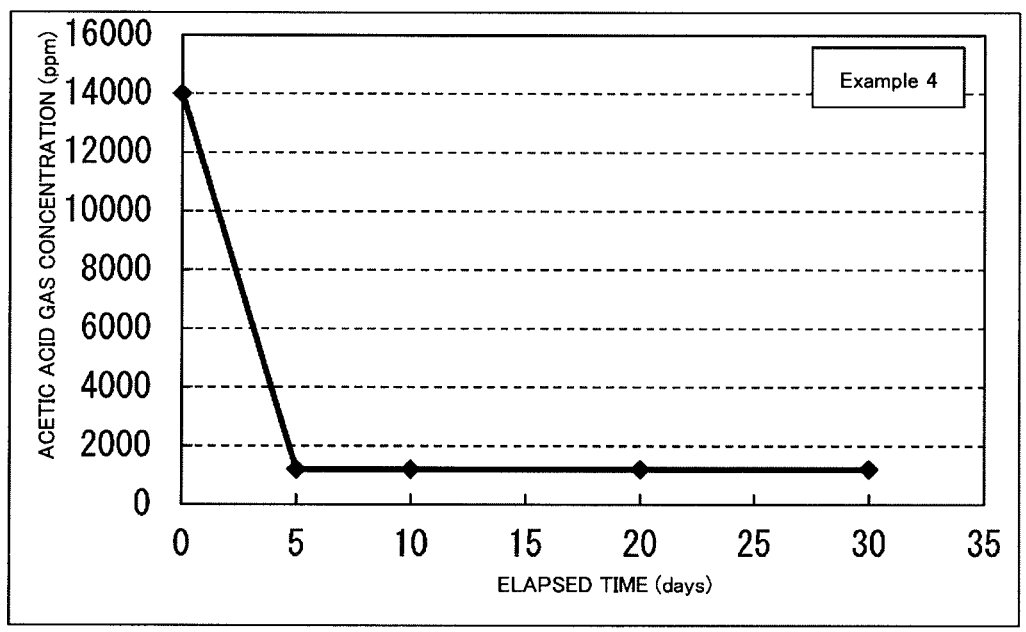
FIG. 4 shows the variation of the acetic acid gas concentration when the acetic acid gas removing agent (Sample 4) of Example 4 was used.

FIG. 4 shows the variation of the acetic acid gas concentration in the desiccator when Sample 4 was used.

As shown in FIG. 4, when potassium hydrogen carbonate was used as the acetic acid gas removing agent, the acetic acid gas concentration was 14000 ppm immediately before the placement of Sample 4 and was decreased to 1200 ppm at an elapsed time of 5 days (120 hours) from the placement of Sample 4. Subsequently, the acetic acid concentration was continuously maintained at 1200 ppm, even at an elapsed time of 30 days (720 hours).

In this way, it has been verified that potassium hydrogen carbonate can rapidly decrease the acetic acid gas concentration in the desiccator, and can maintain the low level of acetic acid gas concentration in the desiccator over a long period of time. This is probably due to large removal amount of the acetic acid gas per unit mass of potassium hydrogen carbonate and fast removal rate of the acetic acid gas by using potassium hydrogen carbonate.

e) Comparative Sample 1

Figure 5:
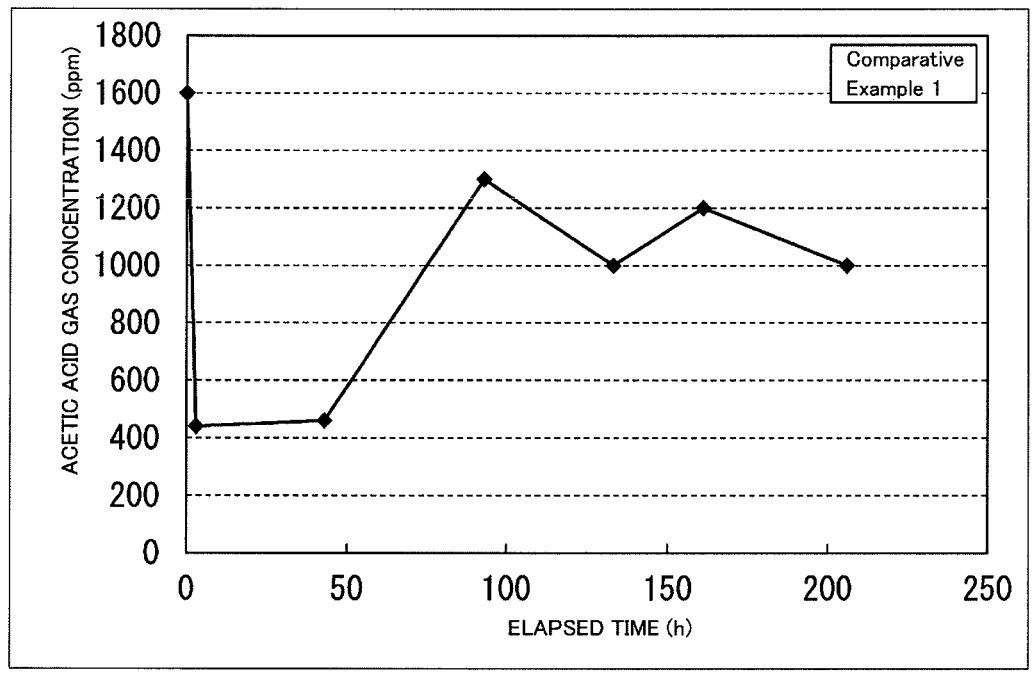
FIG. 5 shows the variation of the acetic acid gas concentration when the acetic acid gas removing agent (Comparative Sample 1) of Comparative Example 1 was used.

FIG. 5 shows the variation of the acetic acid gas concentration in the desiccator when Comparative Sample 1 was used.

As shown in FIG. 5, when the molecular sieve 5A was used as the acetic acid gas removing agent, the acetic acid gas concentration was approximately 1600 ppm immediately before the placement of Comparative Sample 1 and was largely decreased to 440 ppm at an elapsed time of approximately 3 hours from the placement of Comparative Sample 1. However, the acetic acid gas concentration was increased again after an elapsed time of 50 hours, and reached approximately 1300 ppm at an elapsed time of approximately 96 hours, and was approximately 1000 ppm even after an elapsed time of approximately 200 hours.

In this way, it has been verified that the molecular sieve 5A can rapidly decrease the acetic acid gas concentration in the desiccator. However, it has been verified that the molecular sieve 5A cannot maintain the low level of acetic acid gas concentration in the desiccator over a long period of time.

As compared with an alkali metal carbonate and an alkali metal hydrogen carbonate, the molecular sieve 5A is smaller in the acetic acid gas removal amount (acetic acid adsorption amount) per unit mass, and additionally, the adsorption and release of the acetic acid gas occur repeatedly. Consequently, in the case where the molecular sieve 5A is used as the acetic acid gas removing agent, when a larger amount of the acetic acid gas is emitted from a TAC film than the removal amount of acetic acid gas by using the molecular sieve 5A, the molecular sieve 5A probably cannot maintain the low level of acetic acid gas concentration inside the desiccator. The acetic acid gas concentration in the desiccator was probably varied depending on the difference between the amount or the emission rate of the acetic acid gas emitted from the TAC film and the removal amount or the removal rate of the acetic acid gas by using the molecular sieve 5A.

f) Comparative Sample 2

Figure 6:
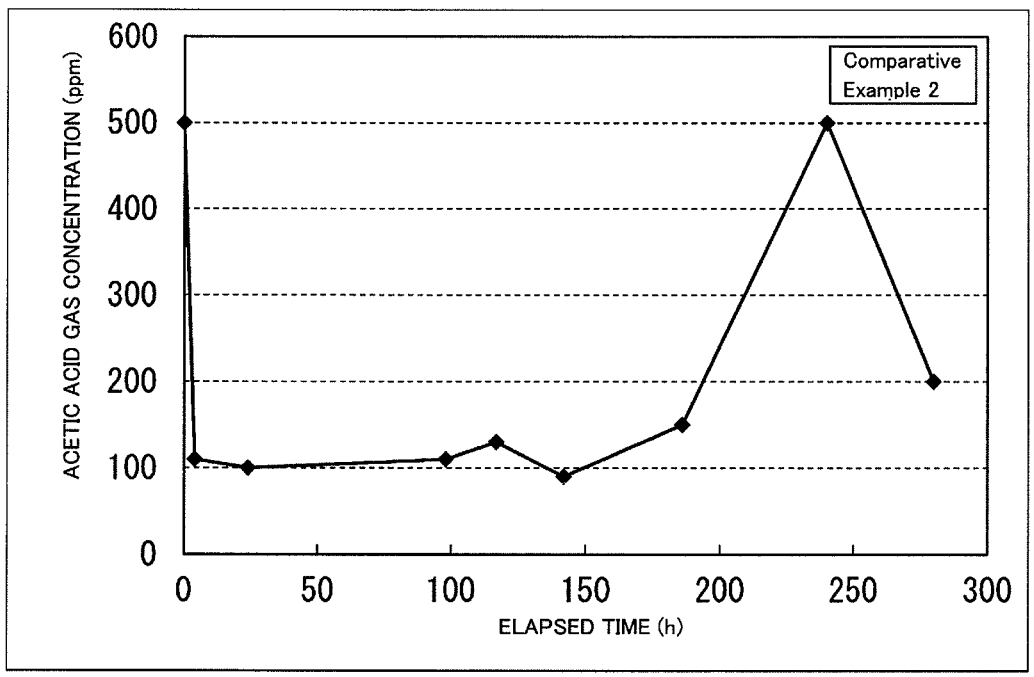
FIG. 6 shows the variation of the acetic acid gas concentration when the acetic acid gas removing agent (Comparative Sample 2) of Comparative Example 2 was used.

FIG. 6 shows the variation of the acetic acid gas concentration in the desiccator when Comparative Sample 2 was used.

As shown in FIG. 6, when sodium polyacrylate was used as the acetic acid gas removing agent, the acetic acid gas concentration was approximately 500 ppm immediately before the placement of Comparative Sample 2 and was largely decreased to 110 ppm at an elapsed time of approximately 3 hours from the placement of Comparative Sample 2, and subsequently, the acetic acid gas concentration was maintained between 90 and 130 ppm until the elapsed time of 150 hours. However, the acetic acid gas concentration was increased again after an elapsed time of 150 hours, and reached approximately 500 ppm at an elapsed time of approximately 240 hours, and was approximately 200 ppm even after an elapsed time of approximately 278 hours.

In this way, it has been verified that sodium polyacrylate can rapidly decrease the acetic acid gas concentration in the desiccator. From this finding, sodium polyacrylate is probably effective in the prevention of the deterioration of a small-size TAC film, to remove a small amount of the acetic acid gas such as 80 ppm. However, it has been verified that sodium polyacrylate cannot maintain the low level of acetic acid gas concentration in the desiccator over a long period of time. As compared with an alkali metal carbonate and an alkali metal hydrogen carbonate, sodium polyacrylate has a smaller capacity for removing the acetic acid gas per unit mass. Consequently, when a larger amount of acetic acid gas than the removal amount by using sodium polyacrylate is emitted from a TAC film, sodium polyacrylate probably cannot maintain the low level of acetic acid gas concentration inside the desiccator. The acetic acid gas concentration in the desiccator was probably varied depending on the difference between the amount or the emission rate of the acetic acid gas emitted from the TAC film and the removal amount or the removal rate of the acetic acid gas of sodium polyacrylate.

g) Comparative Sample 3

Figure 7:
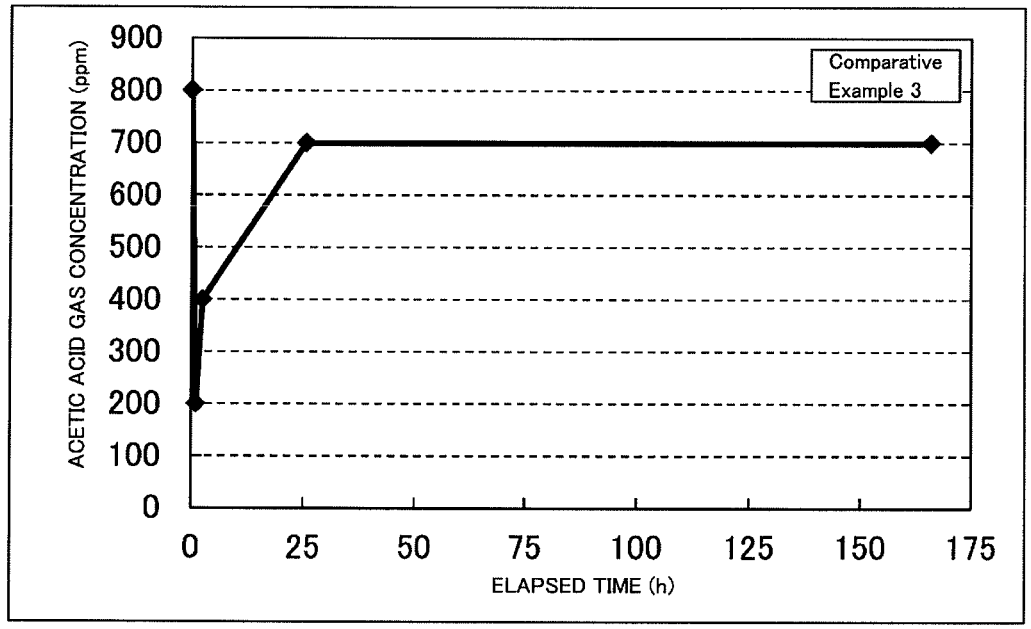
FIG. 7 shows the variation of the acetic acid gas concentration when the acetic acid gas removing agent (Comparative Sample 3) of Comparative Example 3 was used.

FIG. 7 shows the variation of the acetic acid gas concentration in the desiccator when Comparative Sample 3 was used.

As shown in FIG. 7, when calcium carbonate was used as the acetic acid gas removing agent, the acetic acid gas concentration was approximately 800 ppm immediately before the placement of Comparative Sample 3 and was largely decreased to 200 ppm at an elapsed time of approximately 1 hour from the placement of Comparative Sample 3. However, the acetic acid gas concentration was increased again after an elapsed time of 3 hours, and reached approximately 700 ppm at an elapsed time of approximately 28 hours, and kept even after an elapsed time of approximately 160 hours.

In this way, it has been verified that calcium carbonate can rapidly decrease the acetic acid gas concentration in the desiccator. From this finding, calcium carbonate is probably effective in the prevention of the deterioration of a small-size TAC film to remove a small amount of the acetic acid gas such as 80 ppm. However, it has been verified that calcium carbonate cannot maintain the low level of acetic acid gas concentration in the desiccator over a long period of time. As compared with an alkali metal carbonate and an alkali metal hydrogen carbonate, calcium carbonate has a smaller capacity for removing the acetic acid gas per unit mass. Consequently, when a larger amount of acetic acid gas than the removal amount of acetic acid gas by using calcium carbonate is emitted from a TAC film, calcium carbonate probably cannot maintain the low level of acetic acid gas concentration inside the desiccator.

h) Comparative Sample 4

Figure 8:
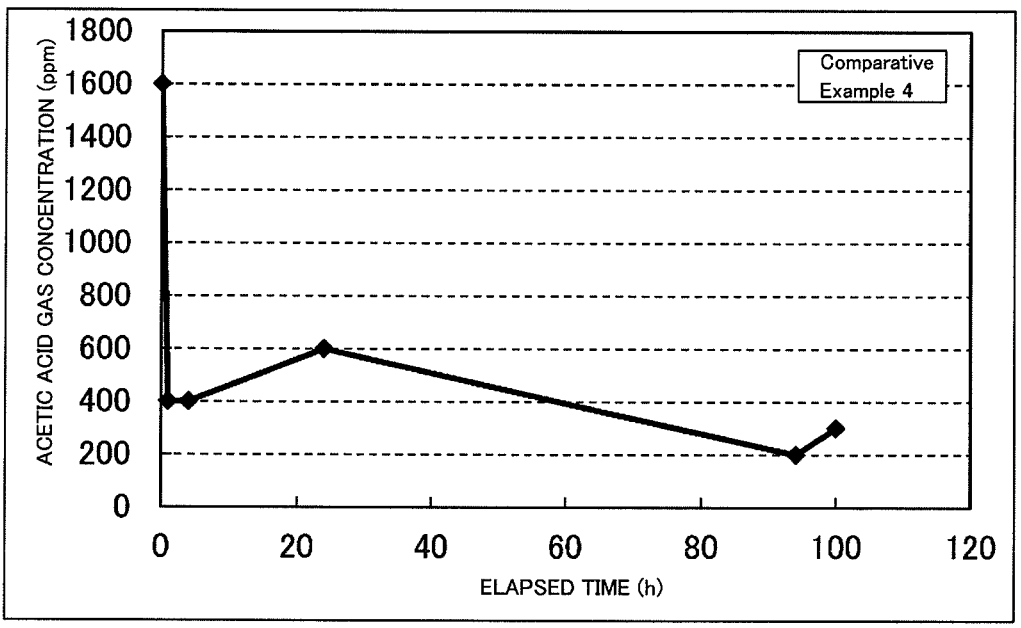
FIG. 8 shows the variation of the acetic acid gas concentration when the acetic acid gas removing agent (Comparative Sample 4) of Comparative Example 4 was used.

FIG. 8 shows the variation of the acetic acid gas concentration in the desiccator when Comparative Sample 4 was used.

As shown in FIG. 8, when sodium hydroxide was used as the acetic acid gas removing agent, the acetic acid gas concentration was approximately 1600 ppm immediately before the placement of Comparative Sample 4 and was largely decreased to 400 ppm at an elapsed time of approximately 1 hour from the placement of Comparative Sample 4. However, the acetic acid gas concentration was increased again after an elapsed time of 4 hours, and reached approximately 600 ppm at an elapsed time of approximately 24 hours, and then decreased to be approximately 300 ppm after an elapsed time of approximately 100 hours.

In this way, it has been verified that sodium hydroxide can rapidly decrease the acetic acid gas concentration in the desiccator, and at the same time, can maintain the low level of acetic acid gas concentration in the desiccator over a long period of time. However, as described above, sodium hydroxide is difficult to handle, and is not suitable for application as an acetic acid gas removing agent.

From the results that has been described above, it has been verified that Samples 1 to 3 can maintain the low level of acetic acid gas concentration in the desiccator over a long period of time.

INDUSTRIAL APPLICABILITY

According to the present invention, by using an alkali metal carbonate or an alkali metal hydrogen carbonate as the acetic acid gas removing agent, even in the case where a large amount of acetic acid gas is continuously generated from a TAC film, the acetic acid gas concentration inside a preservation container can be maintained low so as to be suitable for a preservation object. Therefore, recording films (recording materials) such as TAC films and PET films can be preserved over a long period of time without being deteriorated, and various historical data, documents and the like can be preserved without being deteriorated.

In addition, an alkali metal carbonate or an alkali metal hydrogen carbonate can remove other acid gases except for acetic acid gas. Accordingly, an acid gas removing agent using an alkali metal carbonate or an alkali metal hydrogen carbonate can be used for a measure against a sick house syndrome or the like by applying the acid gas removing agents to architectural materials and the like.

The invention claimed is:

1. A film deterioration preventing material for using together with a record storage film having a triacetyl cellulose film as a base film thereof,
   wherein the material includes an alkali metal carbonate or an alkali metal hydrogen carbonate as an acetic acid gas removing agent to remove the acetic acid gas in an atmosphere.

2. The film deterioration preventing material according to claim 1, wherein the alkali metal carbonate is sodium carbonate or potassium carbonate.

3. The film deterioration preventing material according to claim 1, wherein the alkali metal hydrogen carbonate is sodium hydrogen carbonate or potassium hydrogen carbonate.

4. The film deterioration preventing material according to claim 1, wherein the film deterioration preventing material is a mixture of at least a film deterioration inhibitor including the acetic acid gas removing agent as a component and a thermoplastic resin.

5. The film deterioration preventing material according to claim 1, wherein at least the film deterioration inhibitor including the acetic acid gas removing agent as a component is enclosed in a container.

6. The film deterioration preventing material according to claim 1, wherein the film deterioration preventing material is sheet-shaped.

7. An acid gas removing agent to remove the acid gas in an atmosphere,
   wherein the acid gas in the atmosphere is removed by an alkali metal carbonate or an alkali metal hydrogen carbonate.

* * * * *